United States Patent
Goto

(10) Patent No.: US 9,070,946 B2
(45) Date of Patent: Jun. 30, 2015

(54) ELECTROLYTE-ELECTRODE JOINED ASSEMBLY AND METHOD FOR PRODUCING THE SAME

(75) Inventor: Taichi Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 334 days.

(21) Appl. No.: 13/005,000

(22) Filed: Jan. 12, 2011

(65) Prior Publication Data

US 2011/0177424 A1 Jul. 21, 2011

(30) Foreign Application Priority Data

Jan. 19, 2010 (JP) .................................. 2010-009250

(51) Int. Cl.
*H01M 4/86* (2006.01)
*H01M 4/90* (2006.01)
*H01M 8/12* (2006.01)

(52) U.S. Cl.
CPC ............ *H01M 4/8621* (2013.01); *H01M 4/861* (2013.01); *H01M 4/8657* (2013.01); *H01M 4/9016* (2013.01); *H01M 4/9033* (2013.01); *H01M 8/1253* (2013.01); *H01M 2004/8689* (2013.01); *Y02E 60/50* (2013.01)

(58) Field of Classification Search
USPC ......... 429/482, 481, 483, 484, 491, 523, 529, 429/532, 533, 535
See application file for complete search history.

(56) References Cited

U.S. PATENT DOCUMENTS

| | | | |
|---|---|---|---|
| 5,114,803 A | 5/1992 | Ishihara et al. | |
| 5,151,334 A | 9/1992 | Fushimi et al. | |
| 2010/0248073 A1 | 9/2010 | Higuchi et al. | |

FOREIGN PATENT DOCUMENTS

| | | | |
|---|---|---|---|
| EP | 0722193 A1 | 7/1996 | |
| EP | 0722193 B1 | 7/1996 | |
| JP | 4-121968 A | 4/1992 | |
| JP | 07-118327 | 12/1995 | |
| JP | 2841528 | 10/1998 | |
| JP | 2940008 | 6/1999 | |
| JP | 2003-331866 A | 11/2003 | |
| JP | 2005-327507 | * 11/2005 | .............. H01M 8/02 |
| JP | 2005-327507 A | 11/2005 | |
| WO | 2009069685 A1 | 6/2009 | |

OTHER PUBLICATIONS

Japanese Patent Office, Notice of Rejection dated Apr. 22, 2014, in corresponding JP Appln. 2011-008778, in Japanese, 5 pages.
Japanese Patent Office, Notice of Rejection dated Apr. 22, 2014, in corresponding JP Appln. 2011-008778, English summary, 1 page.

\* cited by examiner

*Primary Examiner* — Raymond Alejandro
(74) *Attorney, Agent, or Firm* — Capitol City TechLaw, PLLC; Samuel P. Burkholder

(57) ABSTRACT

In an electrolyte-electrode joined assembly (MEA), a cathode is formed on an intermediate layer stacked on a solid electrolyte. The cathode is a laminate containing at least a first layer facing the intermediate layer and a second layer disposed on the first layer. The first layer contains a perovskite-type composite oxide represented by $Ba_xSr_{1-x}Co_yFe_{1-y}O_3$ or $La_xSr_{1-x}Co_yFe_{1-y}O_3$. The intermediate layer has an open pore on a surface thereof facing the first layer, and the pore is filled with the first layer.

13 Claims, 5 Drawing Sheets

FIG. 4

| | INTERMEDIATE LAYER | FIRST LAYER | | CATHODE | | | |
|---|---|---|---|---|---|---|---|
| | | | | SECOND LAYER | | THIRD LAYER | CONDUCTIVITY |
| Ex. 1 | Ce$_{0.9}$Gd$_{0.1}$O$_x$ Firing temp 1400°C Thickness 3 μm | BSCF (powder BET 20 m²/g or more) Firing temp 900°C Thickness 4 μm Porosity 8% | Dense | LSCF (powder BET 7 m²/g) Firing temp 900°C Thickness 25 μm Porosity 35% | Porous | LSC (powder BET 7 m²/g) Firing temp 900°C Thickness 10 μm Porosity 25% | Porous | Excellent |
| Ex. 2 | | | | BSCF (powder BET 11 m²/g) Firing temp 900°C Thickness 25 μm Porosity 30% | Porous | LSC (powder BET 7 m²/g) Firing temp 900°C Thickness 10 μm Porosity 25% | Porous | Excellent |
| Ex. 3 | | | | LSC (powder BET 7 m²/g) Firing temp 900°C Thickness 10 μm Porosity 25% | Porous | | Excellent *1 |
| Ex. 4 | | BSCF (powder BET 20 m²/g or more) Firing temp 1000°C Thickness 4 μm Porosity 5% | Dense | LSCF (powder BET 7 m²/g) Firing temp 1000°C Thickness 25 μm Porosity 22% | Porous | LSC (powder BET 7 m²/g) Firing temp 1000°C Thickness 10 μm Porosity 22% | Porous | Excellent |
| Ex. 5 | | | | BSCF (powder BET 11 m²/g) Firing temp 1000°C Thickness 25 μm Porosity 30% | Porous | LSC (powder BET 7 m²/g) Firing temp 1000°C Thickness 10 μm Porosity 22% | Porous | Excellent |
| Ex. 6 | | LSCF (sputtering) Firing temp 1000°C Thickness 500 nm Porosity 1% | Dense | LSC (powder BET 7 m²/g) Firing temp 1000°C Thickness 10 μm Porosity 22% | Porous | | Excellent *2 |
| Ex. 7 | | BSCF (powder BET 20 m²/g or more) Firing temp 800°C Thickness 4 μm Porosity 20% | Porous | LSC (powder BET 7 m²/g) Firing temp 1000°C Thickness 10 μm Porosity 22% | Porous | | Excellent |
| Comp. Ex. 1 | | LSCF (powder BET 7 m²/g) Firing temp 1000°C Thickness 25 μm Porosity 30% | Porous | LSC (powder BET 7 m²/g) Firing temp 1000°C Thickness 10 μm Porosity 22% | Porous | | Poor *3 |
| Comp. Ex. 2 | | | | LSC (powder BET 7 m²/g) Firing temp 1000°C Thickness 10 μm Porosity 22% | Porous | | Poor *4 |

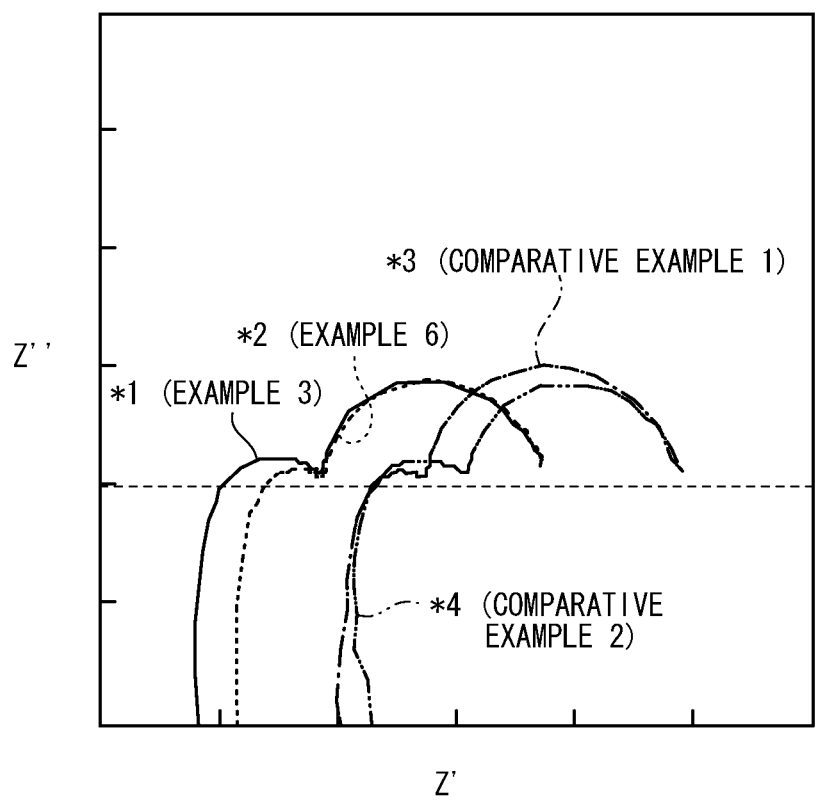

A general object of the present invention is to provide an electrolyte-electrode joined assembly having an increased contact area between an intermediate layer and a cathode.

ELECTROLYTE-ELECTRODE JOINED ASSEMBLY AND METHOD FOR PRODUCING THE SAME

CROSS-REFERENCE TO RELATED APPLICATION

This application is based upon and claims the benefit of priority from Japanese Patent Application No. 2010-009250 filed on Jan. 19, 2010, of which the contents are incorporated herein by reference.

BACKGROUND OF THE INVENTION

1. Field of the Invention

The present invention relates to an electrolyte-electrode joined assembly and a method for producing the same, particularly to an electrolyte-electrode joined assembly interposed between a pair of separators and which is suitable for use in a unit cell of a fuel cell and a method for producing the same.

2. Description of the Related Art

A solid oxide fuel cell (hereinafter referred to as an SOFC) contains an electrolyte-electrode joined assembly (for example, a membrane electrode assembly, and hereinafter referred to as an MEA) produced by sandwiching a solid electrolyte between an anode and a cathode. The MEA is interposed between a pair of separators to form a unit cell of the SOFC. The anode is generally composed of a cermet of Ni and $Y_2O_3$-stabilized $ZrO_2$ (hereinafter referred to as a YSZ). The solid electrolyte is composed of a material having a high oxide ion ($O^{2-}$) conductivity, particularly preferably the YSZ.

The cathode is required to have a high ion conductivity, a high electron conductivity, a catalytic activity in an electrode reaction of oxygen thereon (i.e. an oxygen dissociation reaction), a thermodynamic stability (a low reactivity with another substance such as oxygen-containing gas or solid electrolyte), a porosity sufficient for passage of the oxygen-containing gas, a low sinterability in an electric power generation process, and a high mechanical strength. From this viewpoint, perovskite-type composite oxides represented by $LaMO_3$ (M=Mn, Co, Fe) may be selected as a material of the cathode.

Of such perovskite-type composite oxides, $LaCoO_3$, (La, Sr)$CoO_3$ obtained by partially substituting La with Sr (hereinafter referred to as an LSC), or (La,Sr)(Co,Fe)$O_3$ obtained by partially substituting Co with Fe (hereinafter referred to as an LSCF) can be used for the cathode to reduce overvoltage of the SOFC.

La or Sr in the LSC or LSCF is reacted with Zr in the YSZ of the solid electrolyte at high temperature in a firing treatment in production of the MEA or in an operation of the SOFC. Thus, a layer of the reaction product with a high resistance is formed to deteriorate the conductivity.

In order to prevent the deterioration, in Japanese Laid-Open Patent Publication No. 2003-331866, an intermediate layer is formed as a reaction prevention layer. A $CeO_2$-based oxide such as $Sm_2O_3$-doped $CeO_2$ is selected as a material of the intermediate layer in this patent document.

However, the $CeO_2$-based oxide has a lower sinterability as compared with the Ni—YSZ in the anode, the YSZ in the solid electrolyte, and the perovskite-type composite oxide in the cathode. In other words, the $CeO_2$-based oxide is a sintering-resistant material.

The intermediate layer composed of the $CeO_2$-based oxide can be sufficiently sintered and densified at a high firing temperature. However, at the high temperature, the $CeO_2$-based oxide in the intermediate layer and the material in the electrolyte are interdiffused, resulting in deterioration of the electric property.

If the firing temperature is lowered in order to prevent the deterioration, the intermediate layer cannot be sufficiently densified. In other words, the resultant intermediate layer is a porous body having a large number of pores. The intermediate layer has open pores on the surface facing the cathode, and the open pores are not in contact with the cathode. Therefore, the contact area between the intermediate layer and the cathode is reduced. In this case, the overvoltage is increased to deteriorate the electric property of the cathode.

European Patent No. 0722193, Japanese Patent Publication No. 07-118327, and Japanese Patent Nos. 2841528 and 2940008 disclose that a certain layer is interposed between the intermediate layer and the anode or cathode.

In the conventional techniques described in European Patent No. 0722193, Japanese Patent Publication No. 07-118327, and Japanese Patent Nos. 2841528 and 2940008, the contact area between the electrolyte and the porous cathode or anode is increased, or an electric path of Ni, Pt, etc. is formed. The above patent documents do not disclose that an intermediate layer is a porous body or that an intermediate layer is interposed between the solid electrolyte and the cathode.

Accordingly, the above problems caused in the formation of the intermediate layer cannot be solved by the conventional techniques described in the above patent documents.

SUMMARY OF THE INVENTION

A general object of the present invention is to provide an electrolyte-electrode joined assembly having an increased contact area between an intermediate layer and a cathode.

A principal object of the present invention is to provide an electrolyte-electrode joined assembly capable of maintaining an electric property of a cathode.

Another object of the present invention is to provide a method for producing the above electrolyte-electrode joined assembly.

According to an aspect of the present invention, there is provided an electrolyte-electrode joined assembly comprising an anode and a cathode with a solid electrolyte interposed therebetween, an intermediate layer being formed between the solid electrolyte and the cathode, wherein the intermediate layer is a porous body, the cathode contains at least a first layer in contact with the intermediate layer and a second layer disposed on the first layer, the first layer contains a perovskite-type composite oxide represented by $Ba_xSr_{1-x}Co_yFe_{1-y}O_3$ or $La_xSr_{1-x}Co_yFe_{1-y}O_3$ and has one surface facing the second layer, the one surface being a flat surface, the intermediate layer has an open pore on a surface thereof facing the first layer, the pore being filled with the first layer, and the second layer is a porous body having a pore allowing passage of an oxygen-containing gas.

In the present invention, the porous body of the intermediate layer has the open pore on the surface facing the cathode, and the open pore is filled with the dense first layer (the lowermost layer) of the cathode. Therefore, the intermediate layer and the first layer can have a sufficient contact area, so that the electric property of the cathode can be maintained.

The first layer preferably has a porosity of 15% or less. When the first layer is such a dense body, the contact area between the intermediate layer and the first layer can be sufficiently secured.

Preferred materials for the intermediate layer may include cerium-based ($CeO_2$-based) oxides. In this case, preferred materials for the second layer may include perovskite-type composite oxides represented by $Ba_xSr_{1-x}Co_yFe_{1-y}O_3$, $La_xSr_{1-x}Co_yFe_{1-y}O_3$ or $La_xSr_{1-x}CoO_3$.

The thickness of the first layer is not limited as long as the open pore of the intermediate layer can be filled with the first layer. The second layer acts substantially as a gas diffusion layer, and the thickness thereof is preferably such that the oxygen-containing gas can be easily diffused therein. From the viewpoints, the first layer preferably has a thickness of 0.2 to 5 μm, and the second layer preferably has a thickness of 10 to 40 μm.

The thickness of the intermediate layer is not limited as long as the interaction between the solid electrolyte and the cathode can be prevented. Specifically, the intermediate layer preferably has a thickness of 0.2 to 10 μm.

In order for the second layer to serve as the gas diffusion layer sufficiently as described above, the second layer preferably has a porosity of 10% to 60%.

According to another aspect of the present invention, there is provided a method for producing an electrolyte-electrode joined assembly comprising an anode and a cathode with a solid electrolyte interposed therebetween, an intermediate layer being formed between the solid electrolyte and the cathode, the method comprising:

the steps of forming the anode on one surface of the solid electrolyte directly or with another intermediate layer interposed therebetween, and thereafter forming the cathode on the other surface of the solid electrolyte with the intermediate layer interposed therebetween, or the steps of forming the solid electrolyte on one surface of the anode directly or with the other intermediate layer interposed therebetween, and thereafter forming the cathode on the solid electrolyte with the intermediate layer interposed therebetween, the intermediate layer facing the cathode is formed as a porous body by forming particles into a formed body and thereafter preliminary-sintering the formed body, the cathode is formed as a laminate containing at least a first layer having one flat surface and a second layer disposed on the flat surface, the first layer contains a perovskite-type composite oxide represented by $Ba_xSr_{1-x}Co_yFe_{1-y}O_3$ or $La_xSr_{1-x}Co_yFe_{1-y}O_3$, and an open pore on a surface of the intermediate layer is filled with the first layer.

By this process, the open pore of the intermediate layer (porous body) on the surface thereof facing the cathode, can be filled with the dense first layer (the lowermost layer) of the cathode. Therefore, the intermediate layer and the first layer can have a contact area sufficient for rapidly transferring charges between the intermediate layer and the first layer (the cathode), so that the electric property of the cathode can be maintained.

The first layer can be formed as a dense layer by using a material having a high sinterability as a starting material. For example, the dense first layer can be easily formed by using a $Ba_xSr_{1-x}Co_yFe_{1-y}O_3$ powder having a BET specific surface area of 17 to 30 $m^2/g$ as the material.

As described above, the intermediate layer may be formed from a $CeO_2$-based oxide or the like. The second layer of the cathode may be formed from a perovskite-type composite oxide represented by $Ba_xSr_{1-x}Co_yFe_{1-y}O_3$ or $La_xSr_{1-x}Co_yFe_{1-y}O_3$.

The first layer preferably has a thickness of 0.2 to 5 μm in order to secure the sufficient contact area and to prevent the cracking in a firing treatment. In addition, the second layer preferably has a thickness of 10 to 40 μm in order to easily diffuse a sufficient amount of the oxygen-containing gas therein.

Furthermore, the intermediate layer preferably has a thickness of 0.2 to 10 μm in order to prevent the reaction between the solid electrolyte and the first layer and to prevent the electric resistance increase of the electrolyte-electrode joined assembly.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a table showing the relationship between the conductivity of MEA, the materials, thicknesses and porosities of layers of the cathode, in each MEA of Examples 1 to 7 and Comparative Examples 1 and 2; and FIG. 5 is a graph showing a measured Cole-Cole plot of each MEA of Examples 3 and 6 and Comparative Examples 1 and 2.

DESCRIPTION OF THE PREFERRED EMBODIMENTS

A preferred embodiment of the electrolyte-electrode joined assembly and the production method of the present invention will be described in detail below with reference to accompanying drawings. In the following description, all porosity values mean porosity values obtained after reduction of nickel oxide.

Figure 1:
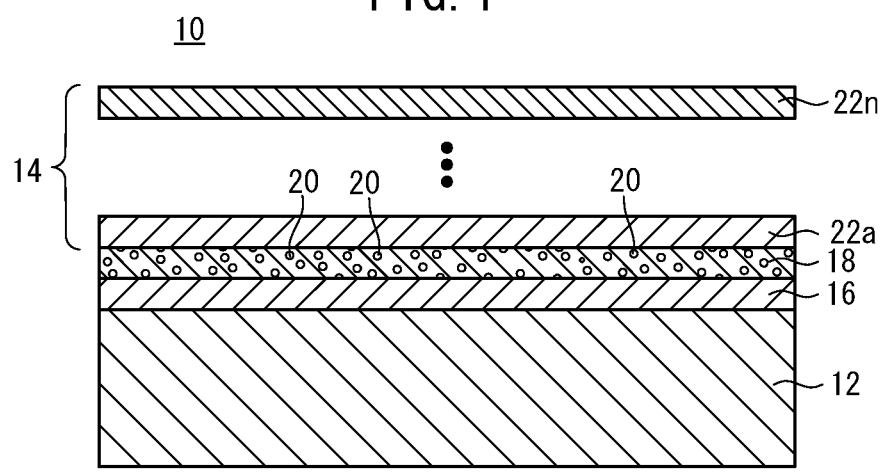
FIG. 1 is an overall, schematic, explanatory, cross-sectional view showing an electrolyte-electrode joined assembly (MEA) according to an embodiment of the present invention.

FIG. 1 is an overall, schematic, explanatory, cross-sectional view showing an electrolyte-electrode joined assembly, for example, a membrane electrode assembly (MEA) 10 according to an embodiment of the present invention. The MEA 10 is formed by interposing a solid electrolyte 16 between an anode 12 and a cathode 14. The MEA 10 is an MEA in an anode-supported cell (hereinafter referred to as the ASC) in which the anode 12 has the largest thickness. An intermediate layer 18 is disposed between the cathode 14 and the solid electrolyte 16.

The material of the anode 12 preferably may include a cermet of Ni and a $Y_2O_3$-stabilized $ZrO_2$ (YSZ). Alternatively, the material of the anode 12 may include a cermet of Ni and an $Sc_2O_3$-stabilized $ZrO_2$ (SSZ), a cermet of Ni and a $Y_2O_3$-doped $CeO_2$ (YDC), a cermet of Ni and an $Sm_2O_3$-doped $CeO_2$ (SDC), a cermet of Ni and a $Gd_2O_3$-doped $CeO_2$ (GDC), etc.

The thickness of the anode 12 made of such a material in the ASC is approximately 200 to 800 μm, preferably approximately 600 μm.

The solid electrolyte 16 may contain a $Y_2O_3$-stabilized $ZrO_2$ having a $Y_2O_3$ content of 8% by mol (8YSZ).

The intermediate layer 18 acts to prevent the diffusion of an element of the cathode 14 into the solid electrolyte 16 (i.e. the interaction between the cathode 14 and the solid electrolyte 16). Thus, the intermediate layer 18 acts as a reaction prevention layer. The thickness of the intermediate layer 18 is not limited as long as the reaction prevention function can be obtained. Specifically, the intermediate layer 18 may have a thickness of approximately 0.2 to 10 μm.

The material of the intermediate layer 18 is not particularly limited as long as the above function can be obtained. For example, the intermediate layer 18 preferably contains an $Sm_2O_3$-doped $CeO_2$ (SDC), a $Y_2O_3$-doped $CeO_2$ (YDC), a $Gd_2O_3$-doped $CeO_2$ (GDC), an $La_2O_3$-doped $CeO_2$ (LDC), or the like, and further preferably contains a $Gd_2O_3$-doped $CeO_2$ having a $Gd_2O_3$ content of 10% by mol (10 GDC).

As schematically shown in FIG. 1, the intermediate layer 18 is a porous body having a large number of pores 20. This is because the above $CeO_2$-based oxide has a low sinterability and thereby is not highly densified in a firing treatment to be hereinafter described.

The pore diameter of the intermediate layer 18 is defined as an average of a long diameter and a short diameter of an opening in a two-dimensional section observed by a scanning electron microscope (SEM). The pore diameter defined in this manner is at most approximately 3 μm. The porosity of the intermediate layer 18 is approximately 25% to 40%.

Figure 2:
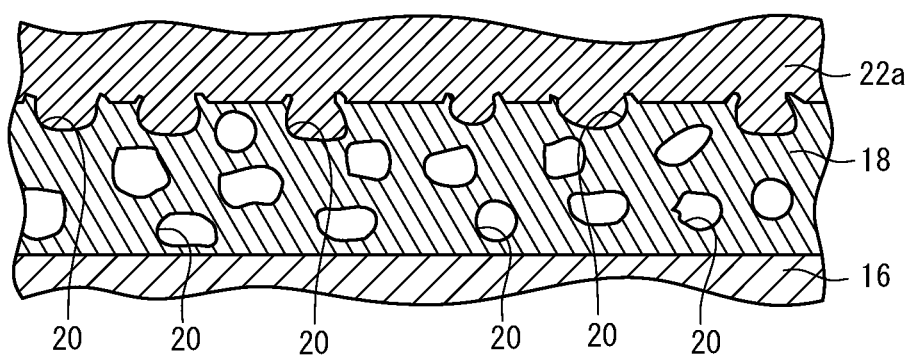
FIG. 2 is an enlarged view showing a principal part of FIG. 1.

As shown in FIG. 2, some of the pores 20 in the intermediate layer 18 are opened on the surface facing the cathode 14. Since the pore diameter of the intermediate layer 18 is at most approximately 3 μm as described above, the open pores 20 have a diameter of at most approximately 3 μm.

The cathode 14 is disposed on the intermediate layer (see FIG. 1). The cathode 14 is a laminate containing a first layer 22a, . . . and an n-th layer 22n, stacked in this order on the solid electrolyte 16. It is to be understood that the first layer 22a is the lowermost layer and the n-th layer 22n is the uppermost layer. The cathode 14 may contain three or four layers, and may contain only two layers of the lowermost and uppermost layers. Thus, the layer number of the cathode 14 may be two or more.

The intermediate layer 18 has the open pores 20 on the surface facing the cathode 14, and the open pores 20 are filled with one surface of the first layer 22a (see FIG. 2). The other surface of the first layer 22a is a flat surface. In such a structure, the surface of the intermediate layer 18, facing the cathode 14, is flattened. Thus, the first layer 22a acts as a flattening layer.

The thickness of the first layer 22a is such that the one surface thereof fills the open pores 20 of the intermediate layer 18 and the other surface is the flat surface. The first layer 22a preferably has a thickness of 0.2 to 5 μm. When the thickness is less than 0.2 μm, the flat surface cannot be easily formed. On the other hand, when the thickness is more than 5 μm, the first layer 22a may be cracked in a firing treatment.

The first layer 22a is formed as a dense body containing a perovskite-type composite oxide represented by $Ba_xSr_{1-x}Co_yFe_{1-y}O_3$ or $La_xSr_{1-x}Co_yFe_{1-y}O_3$, so-called "BSCF" or "LSCF". Therefore, the porosity of the first layer 22a is lower than that of the intermediate layer 18, preferably 15% or less. When the porosity is more than 15%, the flat surface of the first layer 22a cannot be easily formed, and the contact area between the intermediate layer 18 and the first layer 22a is often reduced, resulting in deterioration of the conductivity.

The first layer 22a preferably has a lower porosity. Thus, the porosity of the first layer 22a may be any value of 15% or less. The dense first layer 22a can be formed from a material having a high sinterability, such as a material having a large BET specific surface area.

In this case, the linear thermal expansion coefficient of the first layer 22a matches up with those of the solid electrolyte 16 and the intermediate layer 18. Therefore, the first layer 22a is hardly peeled off (delamination) in the firing treatment or the like. Furthermore, the dense first layer 22a composed of the BSCF has a high conductivity, whereby a satisfactory electric path is formed from the intermediate layer 18 to the n-th layer 22n.

In a case where the cathode 14 has a two-layer structure, the n-th layer 22n (the uppermost layer) corresponds to a second layer. The second layer may contain the perovskite-type composite oxide such as a BSCF ($Ba_xSr_{1-x}Co_yFe_{1-y}O_3$), an LSCF ($La_xSr_{1-x}Co_yFe_{1-y}O_3$), or an LSC ($La_xSr_{1-x}CoO_3$).

In this case, the second layer acts as a gas diffusion layer. Therefore, the second layer is formed as a porous body. The second layer preferably has a porosity of 10% to 60%. When the porosity is less than 10%, the oxygen-containing gas cannot be readily diffused in the second layer. On the other hand, when the porosity is more than 60%, the second layer has a deteriorated strength and thereby may be broken.

The second layer preferably has a thickness of 10 to 40 μm. When the thickness is less than 10 μm, the supply amount of the oxygen-containing gas is reduced. On the other hand, when the thickness is more than 40 μm, the oxygen-containing gas cannot be readily diffused.

Of course, a third layer may be disposed on the second layer. In this case, the third layer corresponds to the n-th layer 22n (the uppermost layer).

In this case, the third layer preferably has an electron diffusion function. Thus, the third layer is preferably formed as an electron diffusion layer.

The material of the third layer with such a function may include an oxygen-reducible material having an electron conductivity higher than that of the cathode at an operating temperature of SOFC. Preferred examples of the materials include composite oxides represented by the composition formula $ACO_3$ containing a rare earth element A, a transition metal element C, and an oxygen element O.

For example, the composite oxide preferably contains at least one rare earth element A selected from the group consisting of La, Sm, Nd and Pr, and preferably contains at least one transition metal element C selected from the group consisting of Co, Fe, Ni, Cr, Mn and Ga. More specifically, the composite oxide may be $LaCoO_3$.

Alternatively, the third layer may be composed of an LSC.

The MEA 10 can be produced in the following manner. First, the anode 12 is formed. For example, mixed particles of NiO particles and YSZ particles (1:1 volume ratio), a binder (such as a polyvinyl butyral binder, an acrylic binder or the like), and a pore-forming agent (such as a PMMA resin, a carbon, etc.) are used to prepare a paste. In this preparation, the diameters of the NiO and YSZ particles, the BET specific surface areas of the NiO and YSZ particles, and the amount of the binder are selected such that a sheet-shaped body for the anode 12 exhibits a shrinkage ratio in a firing treatment that falls within a desired range.

For example, when the NiO particles have a diameter of 1 to 2 μm and a BET specific surface area of 6 to 9 m²/g and the YSZ particles have a diameter of 0.5 to 3 μm and a BET specific surface area of 4 to 8 m²/g, the ratio of the binder is preferably 40% to 65% by volume. In this case, the shrinkage ratio of the anode 12 in the firing treatment can be controlled at 8% to 30%.

Then, a sheet-shaped body for the anode 12 is formed using the above prepared paste by a doctor blade method. The thickness of the sheet-shaped body is preferably selected such that the anode 12 has a thickness of 200 to 800 µm after a pressure bonding treatment using a hot press or the like and the firing treatment. When the anode 12 has a thickness of less than 200 µm after the firing treatment, the anode 12 cannot have a sufficient strength as a support substrate, and a fuel gas supplied to the anode 12 cannot be readily diffused. On the other hand, when the anode 12 has a thickness of more than 800 µm, the stack-direction (thickness-direction) size of the MEA 10 is increased, resulting in a large SOFC. Furthermore, in the operation of the SOFC, the fuel gas is transferred over a longer distance in the thickness direction of the anode 12, and consequently the leakage of the fuel gas may be increased in the thickness direction.

Thereafter the anode 12 may be subjected to a debinding treatment if necessary. The pore-forming agent is removed by the debinding treatment, and then closed pores and opened pores are formed in the positions corresponding to the removed pore-forming agent. The pores have an average diameter corresponding to that of the pore-forming agent. Incidentally, when the debinding treatment is not performed, the pore-forming agent is removed in the firing treatment.

At this point, the anode 12 is composed of the NiO—YSZ.

Meanwhile, a paste is prepared as a starting material for each of the solid electrolyte 16 and the intermediate layer 18. The paste for the solid electrolyte 16 may be prepared by adding an 8YSZ powder and the above binder to a solvent, and the paste for the intermediate layer 18 may be prepared by adding a 10 GDC powder and the above binder to a solvent.

Then, for example, sheet-shaped bodies for the solid electrolyte 16 and the intermediate layer 18 are each formed by a doctor blade method. Each of the sheet-shaped bodies may be formed into a desired thickness not by the doctor blade method but by an extrusion method, a roll coating method, etc.

The solid electrolyte 16 and the intermediate layer (i.e. the above sheet-shaped bodies) are stacked in this order on the anode 12. The layers are pressure-bonded by using a hot press or the like to obtain a laminate containing the anode 12, the solid electrolyte 16, and the intermediate layer 18.

Next, the laminate is subjected to the firing treatment. For example, the firing treatment may be carried out at a temperature of 1100° C. to 1450° C. The anode 12, the solid electrolyte 16, and the intermediate layer 18 are thermally shrunk in the firing treatment.

In this embodiment, the sheet-shaped bodies are stacked and bonded under a temperature or a pressure. Adjacent layers are tightly bonded in this manner and thereby are hardly peeled off in the firing treatment.

At the above described temperature range, the anode 12 and the solid electrolyte 16 are suitably densified, and however the intermediate layer 18 composed of a sintering-resistant material such as $CeO_2$-based oxide is not readily densified. Therefore, as shown in FIG. 2, the intermediate layer 18 is formed as the porous body having a large number of the pores 20.

Then, the cathode 14 is disposed on the intermediate layer 18 in the obtained laminate.

A paste is prepared as a starting material for each of the first layer 22a, the second layer 22b, . . . and the n-th layer 22n. When the cathode 14 has a three-layer structure, for example, the paste for each of the first layer 22a, the second layer, and the third layer may be prepared by adding a powder of the BSCF, LSCF, or $ACO_3$ (A is a rare earth element and C is a transition metal element) and the above binder to a solvent.

The dense first layer 22a may be formed from the BSCF powder having a high sinterability, such as the BSCF powder having a large BET specific surface area. The BSCF powder preferably has a BET specific surface area of 17 to 30 $m^2/g$ in view of easily performing the sintering.

The paste for the first layer 22a is printed on the intermediate layer 18 by a screen printing method. The thickness of the first layer 22a corresponds to that of a screen mesh plate. Thus, the thickness of the screen mesh plate is selected such that the first layer 22a has a desired thickness. The open pores 20 on the surface of the intermediate layer 18 are filled with excess paste in this printing.

The resultant is left as it is at ambient temperature to level (flatten) the paste. The leveling time is selected depending on a desired degree of flattening. In general, the paste can be made approximately flat in about 1 to 2 hours.

The paste is dried at a suitable temperature (e.g. 90° C. to 120° C.) to form an approximately flat first layer 22a.

Thereafter, the first layer 22a is subjected to the firing treatment. In this firing treatment, the first layer 22a is heated at a rate of 100° C./hour to 200° C./hour, and then maintained at a temperature of 800° C. to 1100° C. for 1 to 4 hours. The fired first layer 22a is naturally cooled to ambient temperature.

Subsequently, the paste for the second layer is applied to the first layer 22a in the same manner as above. The other layers are formed by repeating the above steps until the uppermost layer (the n-th layer 22n) is formed, thereby to obtain the cathode 14 containing the first layer 22a to the n-th layer 22n.

Thus, the anode 12, the solid electrolyte 16, and the intermediate layer 18 are simultaneously fired, and then the cathode 14 is formed by screen printing or the like, and thereafter dried and fired. Alternatively, the anode 12 and the solid electrolyte 16 may be simultaneously fired, the intermediate layer 18 may be formed thereon by screen printing or the like and fired, and then the cathode 14 may be formed by screen printing or the like and thereafter dried and fired.

The advantageous effects of the thus-obtained MEA 10 will be described below.

In the case of using the MEA 10 for forming an SOFC, the MEA 10 is interposed between separators to form a unit cell, and a predetermined number of the unit cells are stacked. Then, a pair of end plates are disposed outside the end unit cells of the stack and are fastened by a tie rod or the like, to obtain the SOFC.

Prior to the operation of the SOFC, the NiO—YSZ in the anode 12 is subjected to an initial reduction treatment to transform the NiO to Ni. The treated anode 12 is composed of the Ni—YSZ, so that the MEA 10 becomes capable of generating electric power.

In the operation of the SOFC, the SOFC is heated to a predetermined temperature, and the fuel gas, i.e., hydrogen-fuel gas, is supplied to the anode 12 of each unit cell, while the oxygen-containing gas is supplied to the cathode 14 in each unit cell. The oxygen ionization occurs in the n-th layer 22n (the uppermost layer) of the cathode 14, and the generated oxide ions are transferred through the first layer 22a, the intermediate layer 18, and the solid electrolyte 16 to the anode 12.

As described above, in this embodiment, the open pores 20 of the intermediate layer 18 are filled with the first layer 22a. Therefore, the contact area between the first layer 22a and the intermediate layer 18 is increased, so that the interface resistance is lowered therebetween. Furthermore, since the first layer 22a is suitably composed of the dense BSCF, it has a high conductivity. For the combination of these reasons, the voltage drop in the MEA 10 is reduced. Thus, even when the SOFC discharges at a high current density, a relatively high discharge voltage can be achieved.

In addition, since the intermediate layer 18 is interposed, the interaction between the first layer 22a and the solid electrolyte 16 is prevented. Thus, a layer of the reaction product is not formed.

Figure 3:
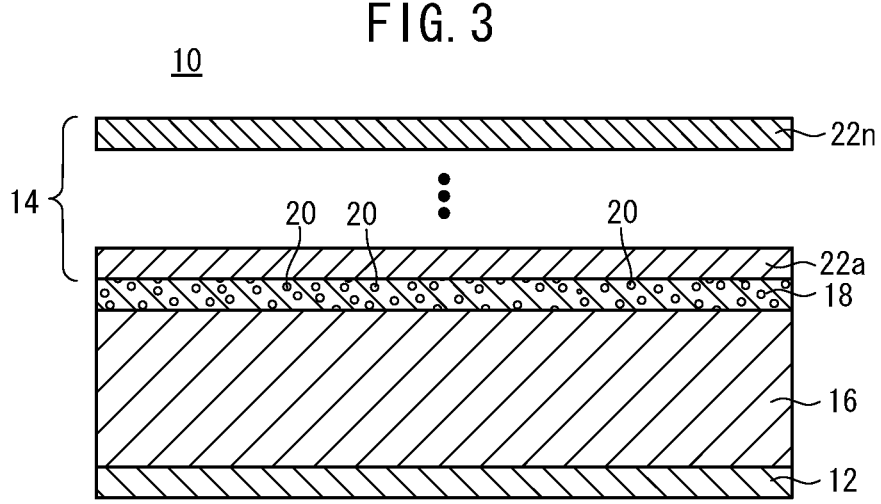
FIG. 3 is an overall, schematic, explanatory, cross-sectional view showing an MEA according to another embodiment.

Though, in the above example of this embodiment, the MEA 10 is an MEA in the ASC in which the anode 12 serves as the substrate, it may be an MEA in an electrolyte-supported-cell (ESC) in which the solid electrolyte 16 serves as the substrate. In this case, as shown in FIG. 3, the electrolyte-supported-type MEA 10 is constructed, in which the solid electrolyte 16 has the largest thickness of approximately 70 to 100 μm.

This MEA 10 may be produced by forming the anode 12 on one surface of the solid electrolyte 16 and forming the intermediate layer 18 and the cathode 14 in this order on the other surface thereof. Of course, the cathode 14 is formed as a laminate containing the first layer 22a to the n-th layer 22n. The n-th layer 22n acts as a group of divided electrodes 22. In the ESC, the thickness of the anode 12 is generally approximately 50 to 100 μm, preferably approximately 90 μm.

When the MEA 10 is the ASC using the anode 12 as the substrate, an intermediate layer may be interposed between the anode 12 and the solid electrolyte 16. This intermediate layer functions to flatten the porous anode 12. The anode 12 has concave and convex portions on the surface facing the solid electrolyte 16, and the concave portions are filled with the intermediate layer and the convex portions are embedded in the intermediate layer. Thus, the intermediate layer acts as a flattening layer.

Though the sheet-shaped bodies are prepared in the above example, the production method is not particularly limited thereto. For example, the anode 12 and the solid electrolyte 16 may be formed by a known process, and the other layers may be formed by a printing process, a CVD process, a PVD process, a coating process such as a spin coating process, a dipping process, etc.

EXAMPLES

Production of Electrolyte-Electrode Joined Assembly

A 100-μm-thick sheet-shaped NiO-YSZ body, a 10-μm-thick sheet-shaped 8YSZ body, and a 1-μm-thick sheet-shaped 10 GDC body were prepared in the above manner respectively, and were stacked in this order. The stack was subjected to a firing treatment to obtain a laminate containing an anode, a solid electrolyte and an intermediate layer.

Meanwhile, a paste containing a $(Ba_{0.5}Sr_{0.5})(Co_{0.8}Fe_{0.2})O_x$ powder having a BET specific surface area of 20 m$^2$/g, a paste containing an $(La_{0.6}Sr_{0.4})(Co_{0.2}Fe_{0.8})O_x$ powder having a BET specific surface area of 7 m$^2$/g, and a paste containing a $(La_{0.5}Sr_{0.5})CoO_x$ powder having a BET specific surface area of 7 m$^2$/g were prepared respectively.

Then, the $(Ba_{0.5}Sr_{0.5})(Co_{0.8}Fe_{0.2})O_x$ paste was printed on the intermediate layer by a screen printing method. The printed paste was leveled, dried and subjected to a firing treatment at 900° C., to form a first layer having a thickness of 4 μm and a porosity of 8%.

The $(La_{0.6}Sr_{0.4})(Co_{0.2}Fe_{0.8})O_x$ paste was printed on the first layer. The printed paste was leveled, dried and subjected to a firing treatment at 900° C., to form a second layer having a thickness of 25 μm and a porosity of 35%.

The $(La_{0.5}Sr_{0.5})CoO_x$ paste was printed on the second layer. The printed paste was leveled, dried and subjected to a firing treatment at 900° C., to form a third layer having a thickness of 10 μm and a porosity of 25%. Thus, an MEA of Example 1, which had a cathode containing the first to third layers, was produced.

In the same manner as Example 1 except that a paste containing a $(Ba_{0.5}Sr_{0.5})(Co_{0.8}Fe_{0.2})O_x$ powder having a BET specific surface area of 11 m$^2$/g was used for forming a second layer, an MEA of Example 2, which had a cathode containing the above first and third layers, and the second layer having a thickness of 25 μm and a porosity of 30%, was produced.

In the same manner as Examples 1 and 2 except that a paste containing a $(La_{0.5}Sr_{0.5})CoO_x$ powder having a BET specific surface area of 7 m$^2$/g was used for forming a second layer and that a third layer was not formed, an MEA of Example 3, which had a cathode containing the above first layer and the second layer having a thickness of 10 μm and a porosity of 25%, was produced.

In the same manner as Example 1 except that the first to third layers were fired at 1000° C., an MEA of Example 4, which had a cathode containing a first layer of the BSCF having a thickness of 4 μm and a porosity of 5%, a second layer of the LSCF having a thickness of 25 μm and a porosity of 30%, and a third layer of the LSC having a thickness of 10 μm and a porosity of 22%, was produced.

In the same manner as Example 4 except that a paste containing a $(Ba_{0.5}Sr_{0.5})(Co_{0.8}Fe_{0.2})O_x$ powder having a BET specific surface area of 11 m$^2$/g was used for forming a second layer, an MEA of Example 5, which had a cathode containing the above first and third layers of Example 4, and a second layer having a thickness of 25 μm and a porosity of 25%, was produced.

In the same manner as Examples 4 and 5 except that a paste containing a $(La_{0.5}Sr_{0.5})CoO_x$ powder having a BET specific surface area of 7 m$^2$/g was used for forming a second layer and that a third layer was not formed, an MEA of Example 6, which had a cathode containing the above first layer of Examples 4 and 5, and a second layer having a thickness of 10 μm and a porosity of 22%, was produced.

Furthermore, the laminate containing the anode, the solid electrolyte, and the intermediate layer was prepared in the same manner as Example 1. A first layer of an LSCF having a thickness of 0.5 μm and a porosity of 1% was formed on the intermediate layer by sputtering.

A paste containing an $(La_{0.5}Sr_{0.5})CoO_x$ powder having a BET specific surface area of 7 m$^2$/g was printed on the first layer. Thereafter, the printed paste was fired at 1000° C. to form a second layer having a thickness of 10 μm and a porosity of 22%.

Thus, an MEA of Example 7, which had a cathode containing the first and second layers, was produced in this manner.

For comparison, an MEA of Comparative Example 1 was produced in the same manner as Example 6 except that the first layer was fired at 800° C. The first layer of Comparative Example 1 had a thickness of 4 μm equal to that of Example 6 and a porosity of 20% higher than that of Example 6. The second layer of Comparative Example 1 had a thickness of 10 μm and a porosity of 22%.

An MEA of Comparative Example 2 was produced in the same manner as Comparative Example 1 except that a LSCF paste was fired at 1000° C. for forming the first layer. In this MEA, the first layer had a thickness of 25 μm and a porosity of 30%, and the second layer had a thickness of 10 μm and a porosity of 22%.

2. Conductivity Comparison

The conductivity of each MEA of Examples 1 to 7 and Comparative Examples 1 and 2 was measured. The results are shown in FIG. 4. FIG. 5 is a Cole-Cole plot of each MEA of Examples 3 and 6 and Comparative Examples 1 and 2.

As is clear from FIGS. 4 and 5, the MEAs of Examples 1 to 7 had satisfactory conductivities, while the MEAs of Comparative Examples 1 and 2 had insufficient conductivities. It is presumed that the contact area between the intermediate layer and the first layer was not sufficiently secured because of the high porosity of the first layer in Comparative Examples 1 and 2.

Although certain preferred embodiments of the present invention have been shown and described in detail, it should be understood that various changes and modifications may be made therein without departing from the scope of the appended claims.

What is claimed is:

1. An electrolyte-electrode joined assembly comprising an anode and a cathode with a solid electrolyte interposed therebetween, an intermediate layer being formed between the solid electrolyte and the cathode, wherein
    the intermediate layer is a porous body including a pore opened on a surface facing the cathode,
    the cathode contains at least a first layer in contact with the intermediate layer and a second layer disposed on the first layer,
    the first layer contains a perovskite-type composite oxide represented by $Ba_xSr_{1-x}Co_yFe_{1-y}O_3$ or $La_xSr_{1-x}Co_yFe_{1-y}O_3$, where $0 \leq x \leq 1$ and $0 \leq y \leq 1$, and has one surface facing the second layer, the one surface being a flat surface,
    the intermediate layer has an open pore on a surface thereof facing the first layer, the pore being filled with the first layer, and
    the second layer is a porous body having a pore allowing passage of an oxygen-containing gas,
    a pore diameter of the pore of the intermediate layer is at most 3 μm, and
    a porosity of the intermediate layer is 25% to 40%.

2. The electrolyte-electrode joined assembly according to claim 1, wherein the first layer has a porosity of 15% or less.

3. The electrolyte-electrode joined assembly according to claim 1, wherein the intermediate layer contains a cerium-based oxide, and the second layer contains a perovskite-type composite oxide represented by $Ba_xSr_{1-x}Co_yFe_{1-y}O_3$, $La_xSr_{1-x}Co_yFe_{1-y}O_3$ or $La_xSr_{1-x}CoO_3$.

4. The electrolyte-electrode joined assembly according to claim 1, wherein the first layer has a thickness of 0.2 to 5 μm, and the second layer has a thickness of 10 to 40 μm.

5. The electrolyte-electrode joined assembly according to claim 4, wherein the intermediate layer has a thickness of 0.2 to 10 μm.

6. The electrolyte-electrode joined assembly according to claim 1, wherein the second layer has a porosity of 10% to 60%.

7. A method for producing an electrolyte-electrode joined assembly comprising an anode and a cathode with a solid electrolyte interposed therebetween, an intermediate layer being formed between the solid electrolyte and the cathode, the method comprising:
    the steps of forming the anode on one surface of the solid electrolyte directly or with another intermediate layer interposed therebetween, and thereafter forming the cathode on the other surface of the solid electrolyte with the intermediate layer interposed therebetween; or
    the steps of forming the solid electrolyte on one surface of the anode directly or with the other intermediate layer interposed therebetween, and thereafter forming the cathode on the solid electrolyte with the intermediate layer interposed therebetween,
    wherein
    the intermediate layer facing the cathode is formed as a porous body by forming particles into a formed body and thereafter preliminary-sintering the formed body,
    the porous body includes a pore opened on a surface facing the cathode,
    a pore diameter of the pore of the intermediate layer is at most 3 μm,
    a porosity of the intermediate layer is 25% to 40%,
    the cathode is formed as a laminate containing at least a first layer having one flat surface and a second layer disposed on the flat surface,
    the first layer contains a perovskite-type composite oxide represented by $Ba_xSr_{1-x}Co_yFe_{1-y}O_3$ or $La_xSr_{1-x}Co_yFe_{1-y}O_3$, where $0 \leq x \leq 1$ and $0 \leq y \leq 1$, and
    an open pore on a surface of the intermediate layer is filled with the first layer.

8. The method according to claim 7, wherein the first layer is formed from a $Ba_xSr_{1-x}Co_yFe_{1-y}O_3$ powder having a BET specific surface area of 17 to 30 m$^2$/g.

9. The method according to claim 7, wherein the intermediate layer contains a cerium-based oxide, and the second layer contains a perovskite-type composite oxide represented by $Ba_xSr_{1-x}Co_yFe_{1-y}O_3$, $La_xSr_{1-x}Co_yFe_{1-y}O_3$ or $La_xSr_{1-x}CoO_3$.

10. The method according to claim 7, wherein the first layer has a thickness of 0.2 to 5 μm, and the second layer has a thickness of 10 to 40 μm.

11. The method according to claim 10, wherein the intermediate layer has a thickness of 0.2 to 10 μm.

12. An electrolyte-electrode joined assembly comprising
    an anode and a cathode with a solid electrolyte interposed therebetween,
    an intermediate layer being formed between the solid electrolyte and the cathode, wherein
    the intermediate layer is a porous body and has a thickness of 0.2 to 10 μm,
    the cathode contains at least a first layer in contact with the intermediate layer and a second layer disposed on the first layer,
    the first layer has a thickness of 0.2 to 5 μm, contains a perovskite-type composite oxide represented by $Ba_xSr_{1-x}Co_yFe_{1-3}O_3$ or $La_xSr_{1-x}Co_yFe_{1-y}O_3$, where $0 \leq x \leq 1$ and $0 \leq y \leq 1$, and has one surface facing the second layer, the one surface being a flat surface,
    the intermediate layer has an open pore on a surface thereof facing the first layer, the pore being filled with the first layer, and
    the second layer has a thickness of 10 to 40 μm and is a porous body having a pore allowing passage of an oxygen-containing gas.

13. The electrolyte-electrode joined assembly according to claim 12, wherein the cathode further comprises a third layer disposed on the second layer and which contains a composite oxide represented by $ACO_3$ wherein A is selected from the group consisting of La, Sm, Nd and Pr, C is selected from the group consisting of Co, Fe, Ni, Cr, Mn and Ga.

* * * * *